Patented Nov. 25, 1952

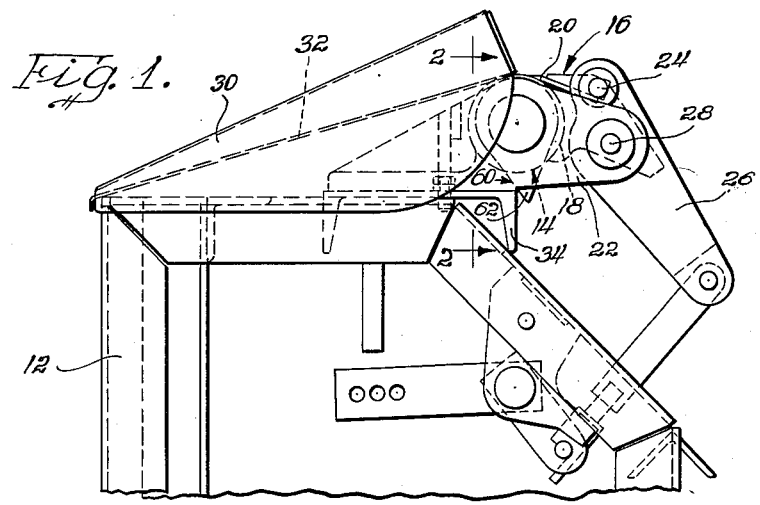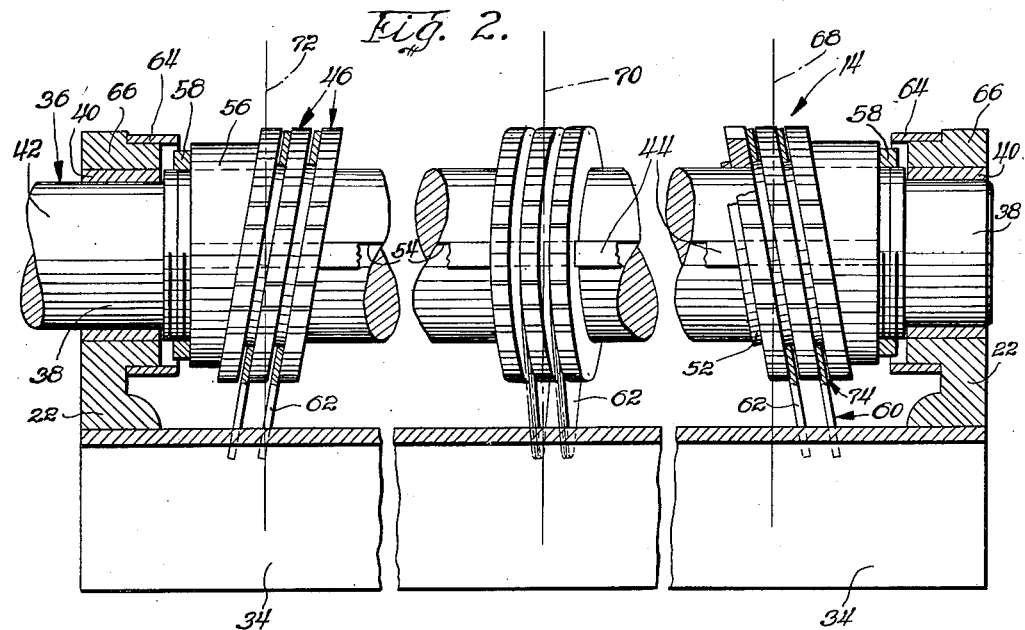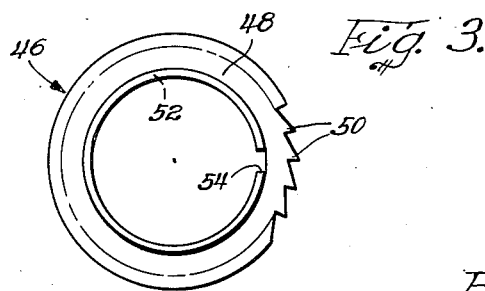

2,619,143

UNITED STATES PATENT OFFICE 2,619,143

STEAK SKINNER

Ray T. Townsend, Des Moines, Iowa, assignor to Townsend Engineering Company, Des Moines, Iowa, a corporation of Iowa Application August 31, 1948, Serial No. 47,127

2 Claims. (Cl. 146—130)

This invention has to do with machines for skinning beef pieces.

The outer skin, or hide, of beef is removed in an ordinary manner, such as by a hand operation; there is another skin-like membrane on the beef which is not removed by the usual skinning operation. It is desired that this membrane be removed by a machine operation, but such has been difficult, if not impossible, due to the nature of the membrane and the types of machines heretofore known.

The membrane is of a stringy nature, i. e., while it is actually a sheet, it is made up of strings held together by a weaker material. Most skinning machines include a toothed roller and a concave pressure shoe which partially surrounds the roller; upon rotation of the roller and cooperation of the shoe therewith, the membrane of the beef piece is gripped between the roller and shoe and removed from the piece.

Due to the stringy nature of the membrane, the membrane becomes bound in the teeth of the roller, in the case of old type skinning machines, and soon a point is reached where operations must cease and the roller cleaned.

An object of the present invention is the provision of a machine for skinning beef pieces by means of which the above noted objections are obviated.

Another object is the provision of such a skinning machine in which the strings of the membrane are constantly being cut into short lengths.

Still another object is the provision of such a skinning machine having a toothed roller in which the teeth are specially arranged to cut the strings as above referred to.

Another object is the provision of such a skinning machine having the specific construction wherein the teeth constantly change in angular position with respect to a given point on the periphery of the roller.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevational view of the upper portion of a skinning machine embodying the present invention;

Figure 2 is an enlarged view taken approximately on line 2—2 of Figure 1 showing the novel roller with different portions thereof in different positions, and portions of the mounting in section; and Figure 3 is a detail view of one of the rings which make up the skinning roller.

Referring in detail to the drawings, the skinning machine shown in Figure 1 includes a frame structure 12 upon which is mounted a skinning roller indicated generally at 14. Cooperating with the skinning roller 14 is a pressure shoe 16 having a concave surface 18 adapted to partially surround the roller. The pressure shoe includes a skinning blade 20, which forms an extension of the peripheral concave surface 18 and is positioned substantially tangential to the roller 14. The roller 14 is provided with teeth. Reference is directed to my copending application, Serial No. 680,939, filed June 2, 1946, which became Patent No. 2,522,728 on September 9, 1950, wherein a toothed roller, a pressure shoe, and a tangential skinning blade are disclosed and claimed.

The roller 14 is mounted in side members 22 which are mounted on the frame 12. The pressure shoe 16 is pivoted at 24 in arms 26 which in turn are pivoted at 28 in the side members 22. The pressure shoe 16 and its mounting on the arms 26 are disclosed and claimed in my copending application, Serial No. 18,204, filed March 31, 1948. The means for bringing the pressure shoe into and out of operable relationship with the skinning roller is also disclosed in detail in the second copending application referred to above.

For purposes of convenience a brief description will be given of the general operation of the skinning machine. A tray 30 is mounted on the top of the frame and the tray has an inclined bottom or deck 32 which terminates adjacent the top of the skinning roller 14. A piece of meat is placed on the tray and moved onto the top of the roller. The skin-like membrane referred to above is gripped by the roller and pressure shoe, with the skinning blade 20 serving to sever the membrane from the meat. The membrane is carried by the roller between the roller and pressure shoe, and the meat passes over the top of the pressure shoe.

Referring to the specific construction of the skinning roller 14 attention is directed to Figures 2 and 3. The frame 12 includes a member 34 extending transversely across the machine and directly supports the side members 22. The side members 22 have aligned openings for the reception of a shaft 36. The shaft has reduced end portions 38 which are journalled in bearings 40 mounted in the openings of the side members 22.

At one end the shaft 36 has an extension 42 for connecting to a power drive, such as an electric motor. The shaft 36 has a main enlarged portion having a keyway and key 44.

The numeral 46 indicates individual rings mounted on the shaft and cooperating therewith to form the roller. Each ring 46 is in the shape of a plane which is disposed at an acute angle with respect to the axis of the ring. Each ring includes a main portion 48 having a plurality of teeth 50 spaced around its periphery. The teeth 50 are disposed in lines parallel with the axis of the ring. At the inner marginal edge of the ring is an annular shoulder 52 or generally axial projection extending to one side of the ring. The projection 52 extends perpendicular to the plane of the ring and is, of course, disposed at an angle to the axis of the ring. The inner marginal edge of the ring is provided with an axial keyway 54.

A plurality of rings 46 are placed on the shaft 36 with their respective projections 52 extending all in one direction. Mounted on each end of the main portion of the shaft outwardly of the rings is a wedge ring 56. The outer surface of each wedge ring 56 lies in a plane perpendicular to the axis of the shaft. The assembly is secured together by lock nuts 58 threaded on the outer ends of the main portion of the shaft.

In the assembly of the toothed rings 46 on the shaft, stripper plates 60 are included, see Figure 1. Each stripper plate has a main portion which is circular and of a diameter less than the outer diameter of the toothed rings 46, and a portion 62 which extends beyond the periphery of the toothed rings 46 and is adapted to engage the portion 34 on the frame of the machine.

The thickness of each stripper plate 60 is less than the axial dimension between the main portions of adjacent toothed rings 46 so that the stripper plates are free for movement axially on the shaft a limited amount. The central opening in the stripper plate 60 is such that it fits over the respective projections 52 loosely so that the stripper plates will not be carried around with the roller in the rotation of the latter, the stripper plates being prevented from rotating by the portion 34 of the frame of the machine.

Shield rings 64 are fitted on reduced portions of the side members 22, and outwardly of the shield rings are enlarged portions 66 of the side members 22, which have curved portions extending radially slightly beyond the toothed rings 46. The enlarged portions are adapted to be engaged by the pressure shoe 16, preventing clashing of the teeth by the pressure shoe.

*Use and operation*

As mentioned above, the piece of meat from which the membrane is to be removed passes over the top of the roller, the roller rotating clockwise as viewed in Fig. 1. In this manner the pieces of meat travel in a line which lies in a plane substantially perpendicular to the axis of the roller. For convenience such lines are indicated at 68, 70, and 72 in Figure 2. Attention is directed to the fact that the different groups of rings in Figure 2 are all alike and all of the rings in the assembled roller would all be orientated in the same direction. However, the various positions of the rings at various steps of rotation of the roller are shown in Figure 2.

Assuming the rings to be in the position shown at the right in Figure 2, it will be noted that the string of the membrane is disposed at an angle to the planes of the rings and will not fall into the space between the adjacent rings. The rings in the position at the right of Figure 2 indicate the position just before they begin to assume an angle in the opposite direction. The lower ends 62 of the stripper plates are being forced to the right by reason of which the stripper plates are in close engagement with the respective rings at the left thereof. At the right of each stripper plate is a slight space indicated at 74 between the stripper plates and the rings to the right.

After reaching the position at the right in Figure 2, the rings on further rotation thereof, approach and reach the position shown at the center, and in moving to that position, the rings are forced to the left. The stripper plates are therefore in tight engagement with the respective rings at the right thereof, and there are spaces between the plates and the rings at the left. This position is shown in the center in Figure 2.

Continued rotation of the rollers swings the lower ends of the stripper plates to the left as shown at the left. In this case also the stripper plates are in tight engagement with the respective rings at the right.

Upon further rotation of the roller, the stripper plates are swung to the right again and in this event the stripper plates are in the position shown in dot-dash lines in the middle in Figure 2. When the rings and stripper plates again reach the position shown at the right in Figure 2, the cycle has been completed.

It will thus be seen that the stripper plates wobble and move from side to side in the spaces between adjacent rings. At one time or another the strings of the membrane, as represented by the lines 68, 70, and 72 will fall into the grooves or spaces between adjacent rings. After the position indicated at the left is reached, the strings are again disposed at an angle to the grooves. The strings then fall into the spaces between the stripper plates and rings at only certain points in the periphery of the roller, and as the stripper plates are caused to move to the opposite sides of the grooves, they cut the strings when they engage the rings.

The strings are thus cut each time the stripper plates change direction in their wobbling movement. This prevents the strings from continually winding up on the roller and becoming bound.

While I have shown a particular embodiment of my invention, it will be understood of course, that I do not wish to be limited thereto since many modifications may be made, and I therefore contemplate by the claims appended hereto to cover any such modifications or substitutions of equivalents as fall within the true spirit and scope of my invention.

I claim:

1. A machine for removing skin from an object comprising a frame, a driven rotatable roller journalled in said frame, a pressure shoe mounted on said frame, said pressure shoe having a reduced leading edge adjacent the roller for parting the skin from said object, said pressure shoe having a concave portion surrounding a substantial portion of said roller and closely spaced therefrom when said pressure shoe is in the position it assumes during the skinning operation, said roller having a skin gripping surface thereon cooperating with said pressure shoe to pull said skin past leading edge, a plurality of axially spaced rings secured on said roller for rotation therewith and extending in planes substantially inclined at an angle with respect to the perpendicular to the axis of said roller, said rings including peripheral teeth defining said skin gripping surface on said roller, plates each thinner than the spacings between said rings loosely disposed around said roller between said rings and having portions projecting radially beyond said teeth, said projecting plate portions being swingable axially of said roller and therefore capable of alternately engaging opposed edges of adjacent rings as said roller is rotated, and means for holding said plates against rotation with said roller when said roller is rotated in a skinning operation.

2. A machine for removing skin from an object comprising a frame, a driven rotatable roller journalled in said frame, a pressure shoe mounted on said frame, said pressure shoe having a reduced leading edge adjacent the roller for parting the skin from said object, said pressure shoe having a concave portion surrounding a substantial portion of said roller and closely spaced therefrom when said pressure shoe is in the position it assumes during the skinning operation, said roller having a skin gripping surface thereon cooperating with said pressure shoe to pull said skin past said leading edge, a plurality of axially spaced rings secured on said roller for rotation therewith and extending in planes substantially inclined at an angle with respect to the perpendicular to the axis of said roller, said rings including peripheral teeth defining said skin gripping surface on said roller, plates each thinner than the spacings between said rings loosely disposed around said roller between said rings and having portions projecting radially beyond said teeth, said projecting plate portions being swingable axially of said roller and therefore capable of alternately engaging opposed edges of adjacent rings as said roller is rotated, and means for holding said plates against rotation with said roller when said roller is rotated in a skinning operation, said plates when so held having their surfaces then opposed to said concave pressure shoe portion extending radially short of said skin gripping roller surface.

RAY T. TOWNSEND.

REFERENCES CITED

The following references are of record in the file of this patent:

UNITED STATES PATENTS

| Number | Name | Date |
|---|---|---|
| 591,322 | Brown, Jr. | Oct. 5, 1897 |
| 601,712 | Lamb | Apr. 5, 1898 |
| 1,281,598 | Letz | Oct. 14, 1918 |
| 1,376,810 | Hieatzman | May 3, 1921 |
| 1,725,176 | Bevis | Aug. 20, 1929 |
| 1,790,619 | Harding | Jan. 27, 1931 |
| 1,964,090 | Spang | June 26, 1934 |
| 2,006,106 | Markert | June 25, 1935 |
| 2,254,969 | Lindsey | Sept. 2, 1941 |
| 2,455,831 | Townsend | Dec. 7, 1948 |

FOREIGN PATENTS

| Number | Country | Date |
|---|---|---|
| 4,241 | Great Britain | Mar. 18, 1890 |
| 14,677 | Great Britain | July 31, 1894 |